(12) United States Patent
Philipps-Liebich et al.

(10) Patent No.: US 6,341,389 B2
(45) Date of Patent: Jan. 29, 2002

(54) SINGLE-LEVER FAUCET WITH MANUAL OR AUTOMATIC FLOW CONTROL

(75) Inventors: Hartwich Philipps-Liebich, Hemer; Peter Dürfeld, Menden; Jürgen Fitting, Iserlohn; Eckhard Kraft, Menden, all of (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 09/773,390

(22) Filed: Feb. 1, 2001

(30) Foreign Application Priority Data

Feb. 9, 2000 (DE) .......................................... 100 05 971

(51) Int. Cl.$^7$ ................................................ E03C 1/05
(52) U.S. Cl. ...................................... 4/623; 251/129.04
(58) Field of Search .................... 4/623, 668, 675–678; 251/129.03, 129.04; 137/801

(56) References Cited

U.S. PATENT DOCUMENTS

| 5,287,570 A | * | 2/1994 | Paterson et al. ................ 4/626 |
| 6,003,170 A | | 12/1999 | Humpert |
| 6,082,407 A | * | 7/2000 | Paterson et al. ............ 4/623 X |

FOREIGN PATENT DOCUMENTS

JP        6257198    *  9/1994 ..................... 4/623

* cited by examiner

*Primary Examiner*—Charles E. Phillips
(74) *Attorney, Agent, or Firm*—Herbert Dubno; Andrew Wilford

(57) ABSTRACT

A faucet assembly has a faucet housing having an outlet, a conduit defining a flow path from a supply of water through the housing to the outlet, an openable and closable servovalve in the conduit, and an openable and closable manual valve in the conduit and having a control element movable between a full-flow open position, an intermediate-flow middle position, and a no-flow closed position. A position-detecting switch subassembly mounted on the housing engages the control element and a proximity detector has a detection field adjacent the outlet. A controller connected to the proximity detector, to the switch subassembly, and to the servovalve serves in the closed position of the element for deactivating the detector and closing the servovalve. In the middle position of the element the controller opens the servovalve on detection of an object in the field of the proximity detector. In the open position of the element the controller disables the detector and opens the servovalve.

10 Claims, 3 Drawing Sheets

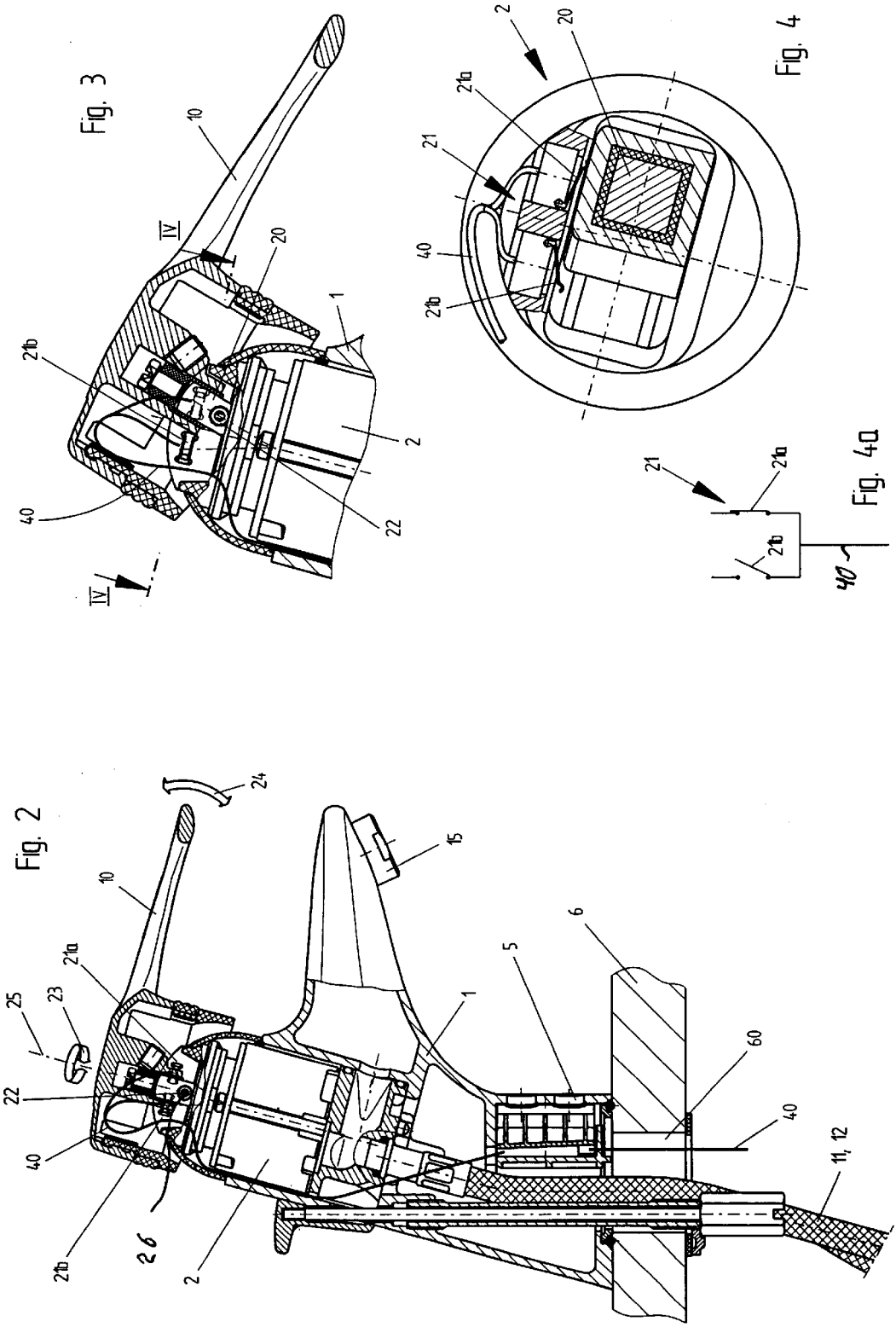

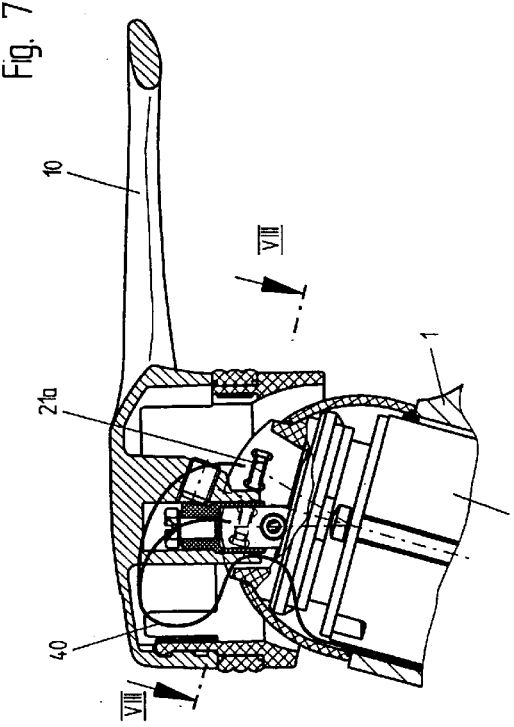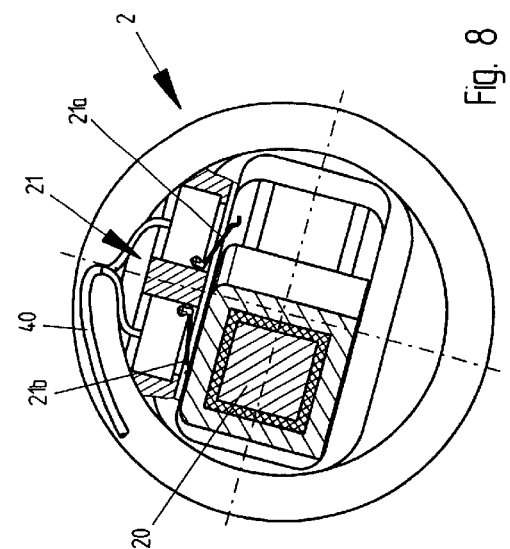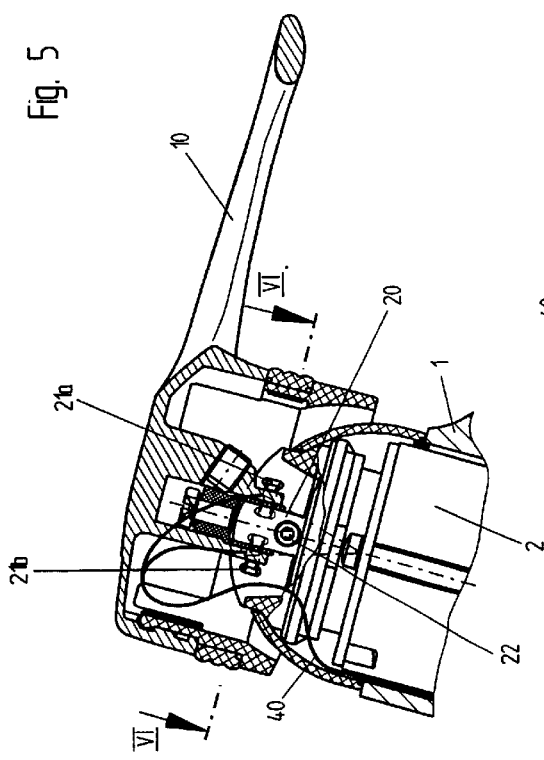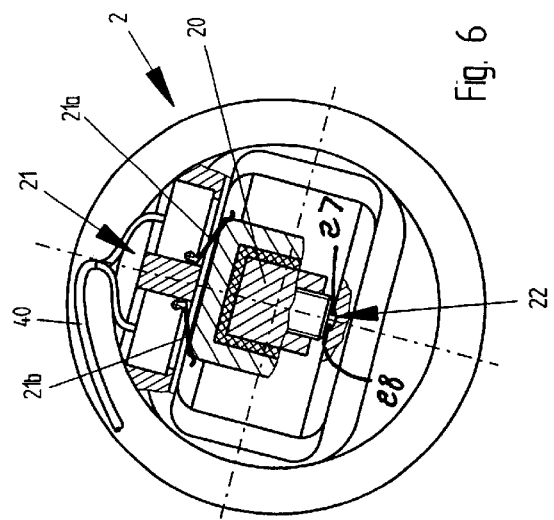

SINGLE-LEVER FAUCET WITH MANUAL OR AUTOMATIC FLOW CONTROL

FIELD OF THE INVENTION

The present invention relates to a faucet. More particularly this invention concerns a single-lever faucet with electronic proximity-sensor control.

BACKGROUND OF THE INVENTION

As described in U.S. Pat. No. 6,003,170 of Humpert and Gransow, a faucet assembly has a conduit defining a flow path between a supply of water and an outlet, a closable manual valve in the conduit, and a lever coupled to the manual valve for shifting it between its open and closed positions. A proximity detector has a detection field adjacent the outlet and is connected to a controller connected between the proximity detector. An openable and closable servovalve is activatable by the controller for opening the servovalve on detection of an object in the field of the proximity detector. A position-detecting switch associated with the manual valve is connected to the controller for activating this controller on shifting of the manual valve into its open position and for deactivating the controller on shifting of the manual valve into its closed position. The supply includes a supply of hot water and a supply of cold water and the manual valve is operable by movement of the lever in one degree of freedom to control a mix of hot and cold water delivered to the conduit and in another degree of freedom to control the volume of flow from the supply to the conduit. The position-detecting switch is only responsive to movement in the other degree of freedom.

Thus in such a standard faucet the controller and proximity detector are only activated, that is they only function, when the valve has been physically moved out of its closed position by the user manipulating the lever. Thus the user raises the lever to the level for the desired rate of flow and then moves it to one side or another to set the desired hot/cold mix. Flow is initiated as in a standard valve. When, however, the user releases the lever a timer is normally started and if, within a predetermined interval, the proximity detector does not sense an object in its field, the servovalve is shut off to save water. Flow can be reinitiated by touching the lever again or putting the hands back in the field of the detector.

Normally with this system the controller maintains the servovalve open for a short time after the control lever is released, to give the user time to place his or her hands under the faucet, whereupon the proximity detector will keep the servovalve open so long as such presence is detected. Once, however, the control lever is released and the user's hands are pulled from the detecting field, the servovalve will automatically close, even if the user leaves the valve handle in the open position.

Such a system is very effective at conserving water as it shuts the water off when there is nothing in its detection field. Even if there is something in the detection field, the system is set to shut the water off after a predetermined time to prevent waste. Furthermore this faucet is very convenient since, if left on, all the user need do is put his or her hands under the faucet to activate the controller and restart flow at the previously set temperature and volume.

The disadvantage of this system is that it is necessary to place something in the detection field to maintain flow, and even then flow will be cut off eventually and the valve will have to be reactuated to restart flow. Thus filling a bucket or the like is difficult, and use of the faucet with a hose or sprayer is out of the question.

OBJECTS OF THE INVENTION

It is therefore an object of the present invention to provide an improved proximity-sensing faucet.

Another object is the provision of such an improved proximity-sensing faucet which overcomes the above-given disadvantages, that is which can be used to fill a bucket, but which still has the advantages of the above-detailed proximity-sensing faucet.

SUMMARY OF THE INVENTION

A faucet assembly has according to the invention a faucet housing having an outlet, a conduit defining a flow path from a supply of water through the housing to the outlet, an openable and closable servovalve in the conduit, and an openable and closable manual valve in the conduit and having a control element movable between a full-flow open position, an intermediate-flow middle position, and a no-flow closed position. A position-detecting switch subassembly mounted on the housing engages the control element and a proximity detector has a detection field adjacent the outlet. A controller connected to the proximity detector, to the switch subassembly, and to the servovalve serves in the closed position of the element for deactivating the detector and closing the servovalve. In the middle position of the element the controller opens the servovalve on detection of an object in the field of the proximity detector. In the open position of the element the controller disables the detector and opens the servovalve.

Thus with this system when the control element, normally a lever, is moved into the full-flow position, the motion-detecting mode set in the middle position is overridden and the manual valve alone controls flow. The faucet can be used to fill a bucket or can be connected to a hose if desired without having to worry about the faucet assembly shutting off the water. At the same time the system has the advantages of above-cited U.S. Pat. No. 6,003,170 of providing a motion-controlled flow in the medium-flow range while completely disabling the motion-detecting mode in the fully closed position to prevent accidental water discharge.

The supply according to the invention includes a supply of hot water and a supply of cold water. The manual valve is operable by movement of the element in one degree of freedom—normally pivotally about an upright axis—to control a mix of hot and cold water delivered to the conduit and in another degree of freedom—normally pivotally about a horizontal axis—to control the volume of flow through the conduit. The position-detecting switch subassembly is only responsive to movement in the other degree of freedom.

The faucet assembly further has according to the invention a stop device having a spring for releasably retaining the element in the middle position. In the middle position the valve passes between 5 liter/minute and 7 liter/minute. The servovalve is a solenoid valve, of the tandem type with a single operating solenoid when the manual valve is a mixing valve. Upstream of the valves the passage is provided with a backflow preventer and a filter.

The position-detecting switch subassembly in accordance with the invention includes a pair of separate switches mounted in the housing and separately engageable with the control element. In the closed position only one of the switches is actuated, in the open position only the other of the switches is actuated, and in the middle position neither of the switches is actuated. The control element can only move through an arc of at most about 4° on the housing while in the middle position. The control means only activating the detector for operating the servovalve in a motion-detecting mode in the middle position. Thus the motion-detecting mode is only started when the control element is nearly in the middle position, and is stopped as soon as it is moved out of this position. Thus any selectable moderately heavy flow is possible in the manual-operation mode.

BRIEF DESCRIPTION OF THE DRAWING

The above and other objects, features, and advantages will become more readily apparent from the following description, reference being made to the accompanying drawing in which:

FIG. 2 is a larger-scale view of the faucet of FIG. 1;

FIG. 3 is a yet larger-scale view of the upper portion of the faucet in a closed position;

FIG. 4 is a section taken along line IV—IV of FIG. 3;

FIG. 4a is a diagrammatic view illustrating the switch positions assumed in FIGS. 3 and 4;

FIG. 5 is a yet larger-scale view of the upper portion of the faucet in a partially open position;

FIG. 6 is a section taken along line VI—VI of FIG. 5;

FIG. 6a is a diagrammatic view illustrating the switch positions assumed in FIGS. 5 and 6;

FIG. 7 is a yet larger-scale view of the upper portion of the faucet in a fully open position;

FIG. 8 is a section taken along line VIII—VIII of FIG. 7; and

FIG. 8a is a diagrammatic view illustrating the switch positions assumed in FIGS. 3 and 4.

SPECIFIC DESCRIPTION

Figure 1:
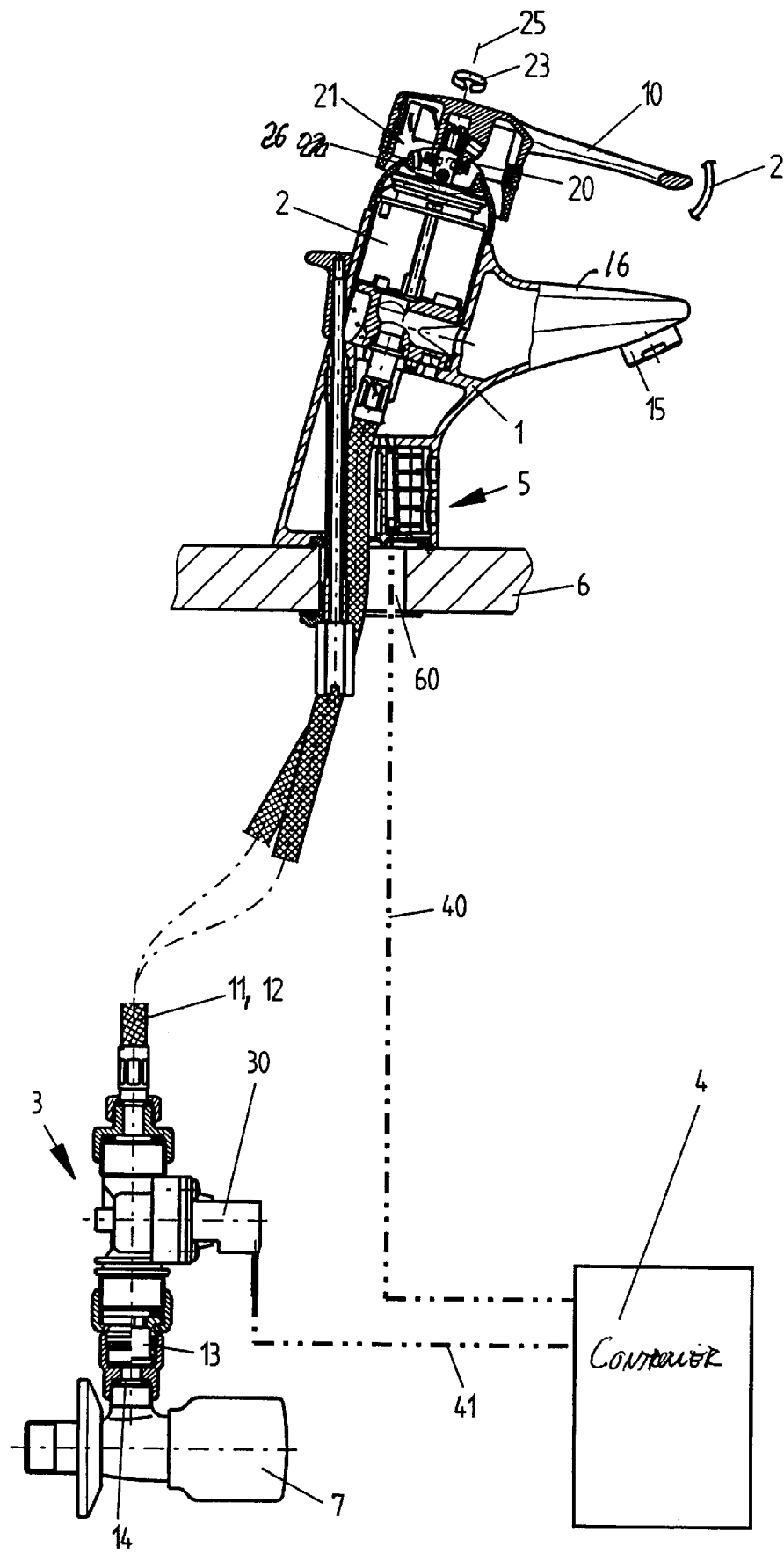
FIG. 1 is a partly diagrammatic vertical section through the faucet system according to the invention.

As seen in FIG. 1 a faucet system according to the invention has a faucet housing 1 mounted on a counter 6 and having hot- and cold-water feed lines 11 and 12 down from the housing 1 through a hole 60 in the counter 6. The downstream ends of these lines 11 and 12 are connected to a standard disk-type valve 2 operated by a control element 20 having a lever or handle 10. Tipping of the handle 10 about an axis 26 as shown by arrow 24 controls the volume/time rate of flow from the lines 11 and 12 to a spout 16 having an outlet 15. Similarly pivoting of the handle 10 about an upright axis 25 perpendicular to the axis 26 controls the mix of flow from the two lines 11 and 12 to the outlet 15, that is the temperature. An infrared detector 5 mounted below the outlet 5 is connected via a multiconductor line 40 extending down through the hole 60 to a controller 4. This is all substantially standard.

According to the invention the housing 1 is fitted with a switch subassembly 21 comprising a pair of normally open SPST microswitches 21a and 21b (FIGS. 3 through 8a) operated by the control element 20 as it is rocked about its axis 26. In addition a stop device 22 comprised of a spring-loaded ball 27 (FIG. 6) mounted in the element 20 and a central ball-receiving notch 28 in the housing 1 is provided that defines for the handle or lever 10 a center position shown in FIGS. 1, 2, 5, and 6. The switches 21a and 21b are also connected via the control line 40 to the controller 4. The water-feed lines 11 and 12 have upstream ends connected to respective control valves 3 (only one shown in FIG. 1) in turn mounted on respective shutoff valves 7 (only one shown) here forming part of the standard sources of pressurized hot and cold water. These valves 3, which can be tandem pilot valves, are openable by one or more solenoids 30 connected via lines 41 to the controller 4. Upstream of each valve 3 is a backflow preventer 13 and a particle filter 14.

As shown in FIGS. 3, 4, and 4a, when the lever 10 is all the way down, that is pivoted fully clockwise as shown in FIG. 3, the element 20 only actuates and closes the microswitch 21a and the manual valve 2 is fully closed. The positions of the switches 21a and 21b deactivate the controller 4 so that the sensor 5 is disabled and, even if something moves in the field immediately in front of the sensor 5, the valves 3 will remain closed.

Movement of the lever 10 up into the middle, intermediate-flow position of FIGS. 5 and 6 will cause the stop 22 to hold the lever 10 and will move the control element 20 between both of the switches 21a and 21b, allowing both of them to open as shown in FIG. 6a. This activates the controller 4 while at the same time partially opening the valve 2. Thus if something moves in the field of the detector 5, the valves 3 will open and there will be flow out the outlet 15 at a moderate rate. If the detector 5 senses nothing, flow will be cut off, normally after a brief delay as described in the above-discussed US patent. Furthermore if something remains in the field of the detector 5 for more than a predetermined amount of time, the controller 4 closes the valves 3 so that the handle 10 has to be returned to the FIG. 3 closed position and raised again to reactivate the sensor 5. In this middle position the valve 2 is set to pass between 5 liter/minute and 7 liter/minute, preferably 6 liter/minute, through the passage formed by the inlet lines 11 and 12 and the housing 1.

Further pivoting of the lever 10 up into the counter-clockwise position shown in FIGS. 7 and 8 will open the valve 2 to a maximum. This movement will also leave the front switch 21a open and close the back switch 21b to make the controller 4 deactivate the sensor 5 while maintaining valves 3 open. Thus flow will continue unimpeded from the outlet 15 whether or not there is something in the field of the sensor 5. This position is therefore useful for, for instance, filling a bucket. Any setting between the intermediate-flow position of FIG. 3 and the maximum-flow position of FIG. 5 can be used in this manual-operation mode.

The switches 21a and 21b are positioned relative to the stop such that the detector 2 is only actuated when the ball 27 snaps into the seat 28. Only when the element 20 is within 2° of this central position or in it are the two switches open as shown in FIG. 6.

In addition, although the servovalves 3 are shown to be upstream of the manual mixing valve 2, this order could be reversed. Thus a single servovalve 3 could be provided in a flow passage from the mixing valve 3 and the outlet 15 as described n above-cited U.S. Pat. No. 6,003,170.

With this faucet, therefore, for normal motion-sensor use the handle 10 is lifted as shown by arrow 24 to the central latched position and pivoted as shown by arrow 25 to select the desired temperature. Then when hands, for instance, are placed under the outlet 15 in the field of the detector 5, water at the selected temperature will issue from the outlet 15. If the handle 10 is pushed down into the FIG. 3 position, no water will come out even if there is some movement in the field of the detector 5, as for instance when loading dishes into the sink or cleaning it. In the opposite end position, with the handle 10 all the way up as in FIG. 7, water will come unimpeded out of the outlet 15 until the faucet is manually shut off, so that a bucket can be filled or a hose attached to the outlet 15 can be used.

We claim:

1. A faucet assembly comprising:

a faucet housing having an outlet;

a conduit defining a flow path from a supply of water through the housing to the outlet;

an openable and closable servovalve in the conduit;

an openable and closable manual valve in the conduit and having a control element movable between a full-flow open position, an intermediate-flow middle position, and a no-flow closed position;

a position-detecting switch subassembly mounted on the housing and engageable with the control element;

a proximity detector having a detection field adjacent the outlet; and control means connected to the proximity detector, to the switch subassembly, and to the servovalve for in the closed position of the element deactivating the detector and closing the servovalve, in the middle position of the element opening the servovalve on detection of an object in the field of the proximity detector, and in the open position of the element disabling the detector and opening the servovalve.

2. The faucet assembly defined in claim 1 wherein the supply includes a supply of hot water and a supply of cold water, the manual valve being operable by movement of the element in one degree of freedom to control a mix of hot and cold water delivered to the conduit and in another degree of freedom to control the volume of flow through the conduit, the position-detecting switch subassembly being only responsive to movement in the other degree of freedom.

3. The faucet assembly defined in claim 1, further comprising means including a spring for releasably retaining the element in the middle position.

4. The faucet assembly defined in claim 3 wherein in the middle position the valve passes between 5 liter/minute and 7 liter/minute.

5. The faucet assembly defined in claim 1 wherein the servovalve is a solenoid valve.

6. The faucet assembly defined in claim 1, further comprising in the passage upstream of the valves:

a backflow preventer, and a filter.

7. The faucet assembly defined in claim 1 wherein the position-detecting switch subassembly includes a pair of separate switches mounted in the housing and separately engageable with the control element.

8. The faucet assembly defined in claim 7 wherein in the closed position only one of the switches is actuated, in the open position only the other of the switches is actuated, and in the middle position neither of the switches is actuated.

9. The faucet assembly defined in claim 8 wherein the control element can only move through an arc of at most about 4° on the housing while in the middle position, the control means only activating the detector for operating the servovalve in a motion-detecting mode in the middle position.

10. The faucet assembly defined in claim 7 wherein the switches are microswitches mounted adjacent each other in the housing.

* * * * *